United States Patent [19]

Miyakawa

[11] Patent Number: 4,687,334

[45] Date of Patent: Aug. 18, 1987

[54] METHOD FOR ADJUSTING DENSITY OF COLOR PICTURE IN COLOR PICTURE OUTPUT DEVICE

[75] Inventor: Tadashi Miyakawa, Kaisei, Japan

[73] Assignee: Fuji Photo Film Co., Ltd., Ashigara, Japan

[21] Appl. No.: 722,214

[22] Filed: Apr. 11, 1985

[30] Foreign Application Priority Data

Apr. 17, 1984 [JP] Japan .................................. 59-77306

[51] Int. Cl.⁴ ................................................ G01J 3/40
[52] U.S. Cl. ..................................... 356/404; 356/406; 356/408; 355/77
[58] Field of Search ............................ 355/32, 35, 77; 356/404, 405, 406, 408, 421, 422, 423, 424, 425

[56] References Cited

U.S. PATENT DOCUMENTS 4,183,990  1/1980  Uchida et al. ............... 356/443 X Primary Examiner—Eugene R. LaRoche
Assistant Examiner—James C. Lee
Attorney, Agent, or Firm—Wenderoth, Lind & Ponack

[57] ABSTRACT

Adjustment of color density of a color picture to be recorded on a photosensitive material is performed in a color picture output device in such a manner that a test pattern print is outputted from the device and the density of the test pattern print is then compared with a standard pattern plate preliminarily prepared. After the actual output picture color density is measured by the standard pattern plate, the gain and offset for obtaining the standard density can be automatically calculated so as to thereby perform in smooth and high speed color picture outputting operation.

5 Claims, 5 Drawing Figures

METHOD FOR ADJUSTING DENSITY OF COLOR PICTURE IN COLOR PICTURE OUTPUT DEVICE

BACKGROUND OF THE INVENTION

This invention relates to a method for adjusting density of color picture in a color picture output device in which the color pictures are outputted or recorded on a photosensitive material with BGR (Blue, Green and Red) luminescent colors.

FIGS. 1 through 3 show views of an example of a color picture output device to which the method of this invention is applicable and in which a rotary member 1 of a disc shape is mounted on a rotating shaft 2 to be rotatable in a direction N and three light emitting diodes 3 loctaed at three portions dividing equally the peripheral surface of the rotary member 1 are arranged so that the three primary colors BGR are illuminated with predetermined frequencies. Below the rotary member 1 is located a copy setting table 4 provided with a picture output portion on which a photosensitive material 5 is set. The photosensitive material 5 is sensed by the luminescent light from the light emitting diodes 3 while rotating, i.e. main scanning, the rotary member 1 so as to output color picture lines on the photosensitive material 5 in the main scanning direction. The rotary member 1 is also constructed to be movable together with the rotating shaft 2 in a direction M as shown in FIG. 2 to carry out the auxiliary scanning operation for the photosensitive material 5, and in accordance with the main and auxiliary scanning operations, the color picture is recorded on the whole surface of the photosensitive material 5. The light emitting diodes 3 are illuminated with predetermined time intervals and luminances in accordance with signals regarding the picture processed by a picture processing unit 10 as shown in FIG. 3 through a drive circuit 11. Into the picture processing unit 10 are inputted a gain signal G and an offset signal S for adjusting the luminances of the light emitting diodes 3 from an external unit (not shown).

The color density and color harmony of the picture to be recorded on the photosensitive material 5 of the device of the construction described above are performed by changing the gain signal G and the offset signal S with respect to the respective three primary colors YMC (Yellow, Magenta, Cyan). For this reason, in conventional methods, the gain signal G and the offset signal S are respectively adjusted with respect to the respective colors of YMC so that the color picture to be recorded on the photosensitive material 5 is sensed thereon with suitable color density and color harmony by repeatedly outputting the picture signals. These operations or procedures are troublesome and involve much time and labor.

SUMMARY OF THE INVENTION

An object of this invention is to eliminate defects or problems in the prior art technique and to provide a method for adjusting density of a color picture in a smooth and precise manner without repeatedly outputting the color picture.

Another object of this invention is to provide a method for adjusting the density of a color picture in which a test pattern print of the color picture is once outputted by utilizing a color picture output device, the test pattern print is compared with a standard pattern plate preliminarily prepared for measuring the actual output picture density, and gain and offset are automatically calculated for obtaining the standard density of the color picture.

According to this invention, for achieving these and other objects, there is provided a method for adjusting density of a color picture outputted on a photosensitive material with a plurality of luminescent colors in a picture output device and the method comprises the steps of outputting a test pattern print on which color step tablets are provided stepwisely with densities divided at predetermined widths of densities between the highest color density and the lowest color density with respect to three primary colors, putting step numbers to the color step tablets in accordance with shades thereof, preparing a standard pattern plate on which standard color patches provided with light and high densities are printed with respect to the three primary colors, comparing the densities of the step tablets with those of the standard color patches with respect to the three primary colors, inputting the step numbers of the step tablets corresponding to the color patches obtained by the comparing step, respectively, and calculating the gain and offset of the luminescent colors so as to thereby adjust the output densities of the picture colors.

The nature, principle and utility of the invention will become more apparent from the following detailed description when read in conjunction with the accompanying drawings.

DESCRIPTION OF THE PREFERRED EMBODIMENT

Figure 1:
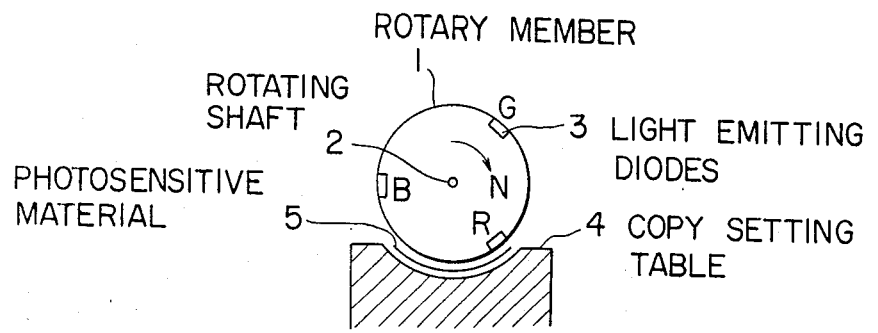
FIG. 1 shows a schematic side view of a scanning portion of a color picture output device to which the method of this invention can be applied.
Figure 2:
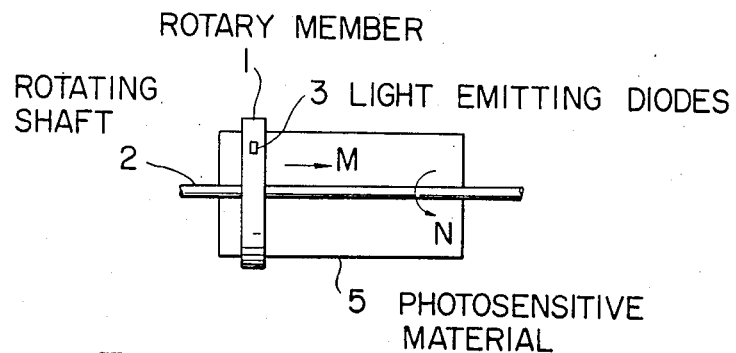
FIG. 2 shows a schematic plane view of the scanning portion shown in FIG. 1.
Figure 3:
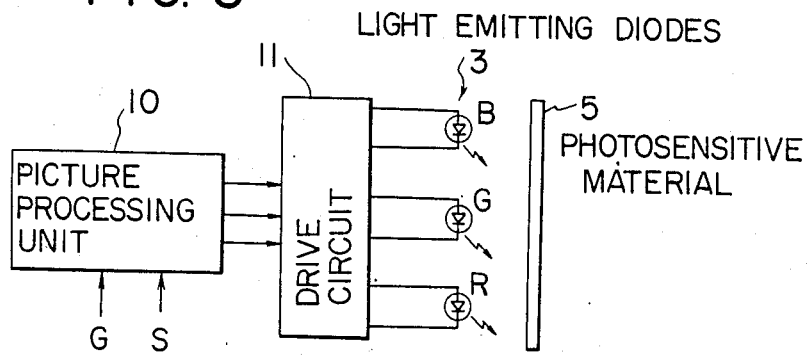
FIG. 3 shows a block diagram of a circuit means for the device shown in FIG. 1.
Figure 4:
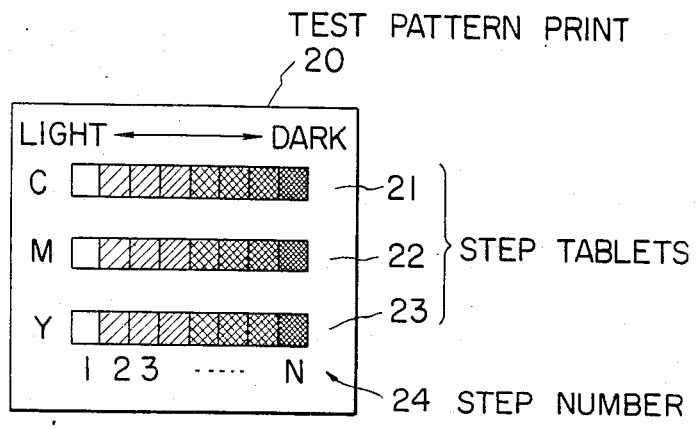
FIG. 4 shows one example of a test pattern print to be used for the method of this invention.
Figure 5:
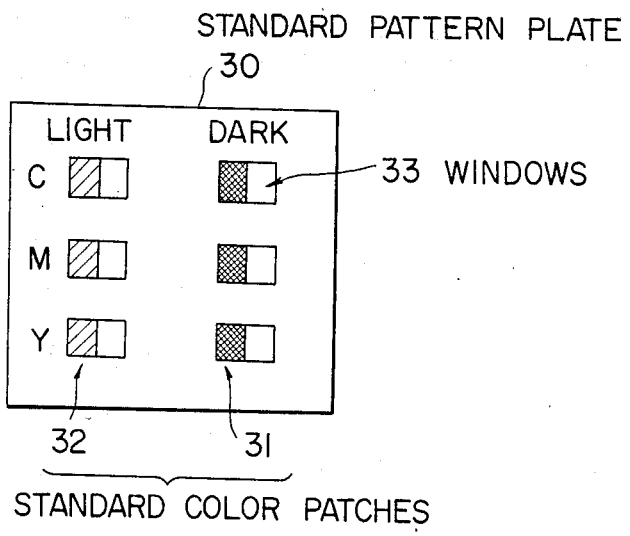
FIG. 5 shows one example of a standard pattern plate to be used for the method of this invention in connection with the test pattern print shown in FIG. 4.

In the color picture output device of the types described hereinbefore, a test pattern print 20 regarding the shade of colors recorded stepwisely with respect to the colors Y,M and C are outputted is as shown in FIG. 4. On the test pattern print 20, step tablets 21, 22 and 23 in rectangular shapes are outputted with densities separated stepwisely with predetermined widths from the lowest density to the highest density with respect to the respective colors YMC, and step numbers 24 (1, 2, . . . N) are recorded on the test pattern print 20 at portions corresponding to the colors having the respective densities as shown in FIG. 4. According to this invention, a standard pattern plate 30 such as shown in FIG. 5 is preliminarily prepared and this standard pattern plate 30 is utilized to inspect that the predetermined densities on the standard pattern plate 30 correspond respectively to what step numbers 24 of the step tablets 21, 22 and 23 of the picture actually outputted by overlapping the standard pattern plate 30 with the test pattern print 20. In detail, on the standard pattern plate 30 are printed standard color patches 31 and 32, in rectangular shapes, respectively, with a series of shades of color densities with respect to the respective colors YMC, and rectangular windows 33 are formed side by side with the standard color patches 31 and 32, respectively. The standard pattern plate 30 is overlapped on the test pattern print 20 so that the windows 33 are positioned on the step tablets 21, 22 and 23 and the standard pattern plate 30 is shifted so as to inspect or confirm that the standard color patches 31 or 32 located side by side with the window 33 corresponds to what density of the step tablets 21, 22 and 23.

In accordance with the manner described above, when the step number 24 of the step tablets 21, 22 and 23 having a density substantially equal to that of the standard color patches 31 or 32 is determined with respect to the colors YMC, respectively, and thus determined step number is inputted into the color picture output device with respect to the respective colors YMC. The color picture output device calculates the gain G and the offset S for obtaining the standard density from the step number inputted into the color picture output device so as to thereby set the constant or coefficient for circuit means such as the drive circuit. The gain G and offset S are calculated by the following equations.

$$G = (DH - DL) \cdot G_0/(dH - dL)$$

$$S = \frac{dH \cdot DL - dL \cdot DH}{G_0 \cdot (dH - dL)} + S_0$$

where $G_O$: Original gain;

$S_O$: Original offset;

DH, DL: Values corresponding to densities of the determined step numbers of the test pattern print; and dH, dL: Density values of the standard color patches 31 and 32 printed on the standard pattern plate 30.

In the embodiment described above, the shapes of the standard color patches and windows are referred to as rectanglar shapes, but these shapes and arrangement thereof are of course changed optionally to any shapes and arrangement. Any types of the color picture output device can of course be utilized in place of the device described herein, for example, a picture output device in which a photosensitive material is mounted to a drum and which is externally illuminated by the BGR colors.

According to the color picture density adjusting method of this invention, the actual density of an output picture can be measured by applying a standard pattern plate preliminarily perpared after a test pattern print has once been outputted by using a color picture output device, so that the gain and offset for obtaining the standard density are automatically calculated so as to thereby enable the rapid and high speed outputting of the color picture.

It should be understood that many modifications and adaptations of the invention will become apparent to those skilled in the art and it is intended to encompass such obvious modifications and changes in the scope of the claims appended hereto.

What is claimed is:

1. A method for adjusting a density of a color picture outputted on a photosensitive material with a plurality of luminescent colors in a color picture output device comprising the steps of:

preparing a test pattern print of the color picture on which color step tablets are provided stepwisely with densities divided at predetermined widths of densities between a highest color density and a lowest color density with respect to three primary colors;

designating step numbers of the color step tablets in accordance with shades thereof;

preparing a standard pattern plate on which standard color patches provided with light and high densities are printed with respect to the three primary colors;

visually comparing the densities of the step tablets with those of the standard color patches with respect to the three primary colors;

respectively inputting step numbers of the step tablets corresponding to the standard color patches obtained by the comparing step; and calculating gain and offset of the luminescent colors of the output device so as to thereby adjust the output densities of the picture colors of the color picture in accordance with the inputted step numbers.

2. A method according to claim 1, wherein the calculating step is performed to obtain a new gain G and a new offset So for the output device regarding the density of the picture color of the color picture in accordance with the equations:

$$G = (DH - DL) \cdot G_0/(dH - dL)$$

$$S = \frac{dH \cdot DL - dL \cdot DH}{G_0 \cdot (dH - dL)} + S_0$$

where

Go: original gain

So: original offset

DH,DL: values corresponding to densities of the determined step numbers of the test pattern print; and dH,dL: density values of the standard color patches printed on the standard pattern plate.

3. A method according to claim 1, wherein the plurality of luminescent colors are blue, green and red (BGR) and the three primary colors are yellow, magenta and cyan (YMC).

4. A method according to claim 1, wherein windows are respectively provided for the standard color patches in a side-by-side relationship with respect to the three primary colors.

5. A method according to claim 1, wherein each of the windows has a rectangular shape.

* * * * *